United States Patent
Schoppe

(10) Patent No.: US 7,198,113 B1
(45) Date of Patent: Apr. 3, 2007

(54) HOLE CUTTER AND METHOD FOR USING SAME

(75) Inventor: Terry L. Schoppe, Cedar Falls, IA (US)

(73) Assignee: Standard Golf Company, Cedar Falls, IA (US)

(*) Notice: Subject to any disclaimer, the term of this patent is extended or adjusted under 35 U.S.C. 154(b) by 325 days.

(21) Appl. No.: 10/995,828

(22) Filed: Nov. 23, 2004

(51) Int. Cl.
*E21B 25/00* (2006.01)
*A01B 45/04* (2006.01)

(52) U.S. Cl. .......................... 172/22; 172/430
(58) Field of Classification Search .................. 172/22
See application file for complete search history.

(56) References Cited

U.S. PATENT DOCUMENTS

| | | | |
|---|---|---|---|
| 4,653,790 A | 3/1987 | Kenney | |
| 4,848,484 A * | 7/1989 | Clements | 175/20 |
| 4,884,638 A | 12/1989 | Hoffman | |
| 4,974,682 A | 12/1990 | Hoffman | |
| 5,338,078 A * | 8/1994 | Basek | 294/50.5 |
| 6,374,758 B1 * | 4/2002 | Mickle et al. | 111/106 |
| 6,386,294 B1 | 5/2002 | Best | |
| 6,662,879 B1 | 12/2003 | Costa | |
| 6,739,401 B1 | 5/2004 | Sova | |
| 6,752,219 B1 | 6/2004 | Fridd | |

FOREIGN PATENT DOCUMENTS

GB 2 182 532 A 5/1987

* cited by examiner

*Primary Examiner*—Frank Tsay
(74) *Attorney, Agent, or Firm*—McKee Voorhees & Sease, P.L.C.

(57) ABSTRACT

A hole cutter includes a frame and first and second blade halves moveably mounted with respect to the frame. The blade halves are first driven into the ground and then are lifted upwardly out of the new hole with as ground plug therebetween. A lift flange engages both the blade halves during this upward movement. Then the blades and the ground plug are inserted into an old hole and the blades are removed simultaneously to leave the ground plug in the old hole. The frame is longitudinally extensible to create this removal of blade halves from the old hole.

15 Claims, 5 Drawing Sheets

HOLE CUTTER AND METHOD FOR USING SAME

BACKGROUND OF THE INVENTION

The present invention relates to a hole cutter and method for using same.

Hole cutters have been used to cut new holes in greens of golf courses. The cutting of a hole must be precise, and the usual method for cutting the hole involves removal of the ground plug from the new hole and placing of the ground plug in the old hole.

FIG. 5 shows a prior art hole cutter. The prior art hole cutter is designated generally by the numeral 10. It includes a frame 12, and handle 14, a middle frame 16, and a base 18. Attached to the frame 12 is a slide frame 20 which includes vertical slide members 22 which support circular slide members 24. Mounted within the circular slide members or rings 24 are a first blade half 26 and a second blade half 28. Each blade half 26, 28 includes an arcuate semi circular blade body 30 having a lower cutting edge 32.

The blade halves 26, 28 are independently driven into the ground by means of a hammer 34 as shown in FIG. 5. Once both of the blade halves 26, 28 have been driven into the ground, they create a new hole. The arcuate blade bodies 30 surround a ground plug (not shown).

After the blade halves 26, 28 have been driven into the ground to create the new hole 38, they must be removed upwardly from the hole. It is desirable that the upward movement of blade halves 26, 28 also removes the ground plug surrounded by the arcuate blade bodies 30. Then the blade halves 26, 28 are reinserted into the old hole 38 while retaining the ground plug removed from the new hole.

The next step in the process is to remove blade halves 26, 28 from the old hole 38 while leaving the ground plug within the old hole 38.

In order to move the blade halves 26, 28 upwardly, a screw driver or other lever 36 is used. Each of the blade halves 26, 28 are moved upwardly independently of one another. This results in the crumbling or destruction of the ground plug that is surrounded by the blade halves 30. Therefore, it is very difficult to remove the blade halves 26, 28 while leaving the ground plug in tact when the two blade halves 26, 28 are moved upwardly independently of one another. The old hole 38 is shown to be within the ground 40 which has an upper ground surface 42.

Therefore, a primary objective of the present invention is the provision of an improved hole cutter and method for using same which removes blades from the old hole while leaving the ground plug in tact within the old hole.

A further object of the present invention is the provision of a hole cutter and method for using same which utilizes stop members on the blade halves for limiting the downward movement of the blade halves in response to being driven into the ground.

A further object of the present invention is the provision of a middle frame that is comprised of first and second middle frames that are longitudinally moveable with respect to one another.

A further object of the present invention is the provision of a hole cutter and method for using same which includes stop pins for holding the first and second middle frame members in upper and lower positions relative to one another.

A further object of the present invention is the provision of a lifting member which permits the blade halves to be lifted upwardly out of the new hole, while retaining the plug in tact between the two blade halves.

A further object of the present invention is the provision of a method for inserting the ground plug into the old hole and withdrawing the blade halves from the ground plug so as to leave the ground plug within the old hole.

A further object of the present invention is the provision of a hole cutter and method for using same which is economical to manufacture, durable in use, and efficient in operation.

SUMMARY OF THE INVENTION

The foregoing objects may be achieved by a hole cutter for cutting a new hole in the ground having an upper ground surface and for taking a plug out of the new hole and placing it into an old hole in the ground. The hole cutter comprises a frame having a handle, a base adapted to rest on the upper surface of the ground and a middle frame interconnecting the handle and base. First and second blades are mounted to the frame. Each of the first and second blades include a downwardly presented cutting edge facing toward the upper surface of the ground and a blade body positioned above the cutting edge. Each of the first and second blades is moveably mounted to the frame for movement independently of one another from an elevated position wherein the cutting edge is positioned at the same level or above the base to a penetrating position wherein the cutting edge is spaced below the base. A lift member on the frame engages both of the first and second blades when the first and second blades are in the penetrating position and is moveable with the frame in an upward direction to lift the first and second blades and the ground plug simultaneously from the new hole.

According to another feature of the present invention, the middle frame comprises a first middle frame member and a second middle frame member that are moveably connected for longitudinal movement with respect to one another from a lower position to an upper position whereby the handle will be moved upwardly and further apart from the base when the first and second middle frame members are in the upper position.

According to another feature of the present invention, the lift member is carried by the first frame member and engages the first and second blades when in their penetrating positions. The lift member causes movement of the first and second blades simultaneously from their penetrating position to their elevated position in response to movement of the first and second middle frame members from their lower position to their upper position.

According to another feature of the present invention, a stop member is located on one of the first and second middle frame members, and upper and lower stop receiving members are on the other of the first and second middle frame members. The stop member retentively engages the lower stop receiving member when the first and second frame members are in the lower position and retentively engages the upper stop receiving member when the first and second frame members are in the upper position.

According to another feature of the present invention, the stop member comprises a pin and the upper and lower stop receiving members each comprise an upper and lower receiving hole respectively for receiving the pin.

According to another feature of the present invention, the pin is spring loaded and is biased toward retentive engagement with the upper and lower receiving holes.

According to another feature of the present invention, the frame includes a slide frame having a slide opening therein. The first and second blades are contained within the slide opening and are moveable for sliding movement therein between the elevated and penetrating positions.

According to the method of the present invention, a hole cutter is used to cut a new hole in the ground and to place the ground plug from the new hole into an old hole in the ground. The method comprises driving the first and second blades independently of one another from their elevated position to their penetrating positions whereby the lower cutting edges of the first and second blades penetrate the upper surface of the ground and penetrate the ground, thereby creating a new hole and a ground plug within the new hole. The method comprises holding the ground plug between the first and second blades and removing the first and second blades from the ground while holding the ground plug therebetween so as to remove the ground plug from the new hole. The first and second blades and the ground plug are then inserted into the old hole and the first and second blades are removed in unison from the old hole while at the same time leaving the ground plug in the old hole.

According to another feature of the method of the present invention, the step of removing the first and second blades in unison from the old hole comprises lifting the first and second blade simultaneously from the penetrating position to the elevated position.

According to another feature of the method of the present invention, the middle frame comprises first and second middle members that are longitudinally moveable with respect to one another from a lower position to an upper position. The step of removing the first and second blades from the old hole comprise moving the middle members longitudinally with respect to one another from the lower to the upper position and engaging both of the blades with a lift member on one of the first and second middle members so as to lift the first and second blades in unison from the penetrating position to the elevating position.

According to another feature of the method of the present invention, the base is held in engagement with the upper surface of the ground during the step of moving the middle members longitudinally with respect to one another from their lower position to their upper position.

According to another feature of the method of the present invention, the step of driving the first and second blades comprises hammering the first blade from the elevated to the penetrating position within the ground and separately hammering the second blade from the elevated to the penetrating position within the ground.

DETAILED DESCRIPTION OF THE PREFERRED EMBODIMENT

Figure 1:
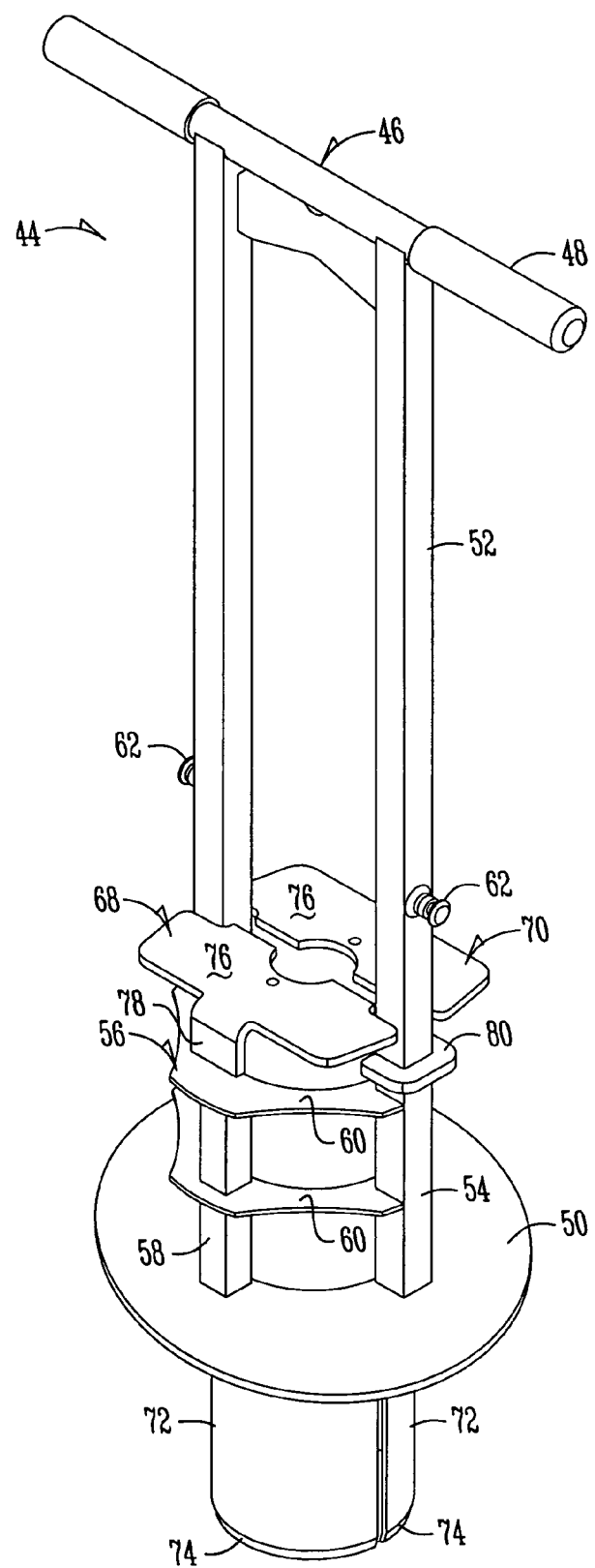
FIG. 1 is a perspective view of the present invention.

Referring to the drawings, the hole cutter of the present invention is designated by the numeral 44. This is the preferred embodiment of the hole cutter and variations may be made in the particular components of the hole cutter of the present invention without detracting from the invention. Hole cutter 44 includes a frame 46 which is comprised of a handle 48, a base 50, a first middle frame 52, and a second middle frame 54. The first and second middle frames are telescoped with respect to one another, but they can be mounted for sliding movement with respect to one another without being telescopically mounted. The important feature of the first and second middle frames 52, 54 is that they be longitudinally extensible with respect to one another.

Mounted in fixed relation to the second middle frame 54 is a slide frame 56. Slide frame 56 includes vertical slide members 58 and circular slide members 60. The circular slide members 60 are ring shaped and include an open center.

Figures 3, 3A:
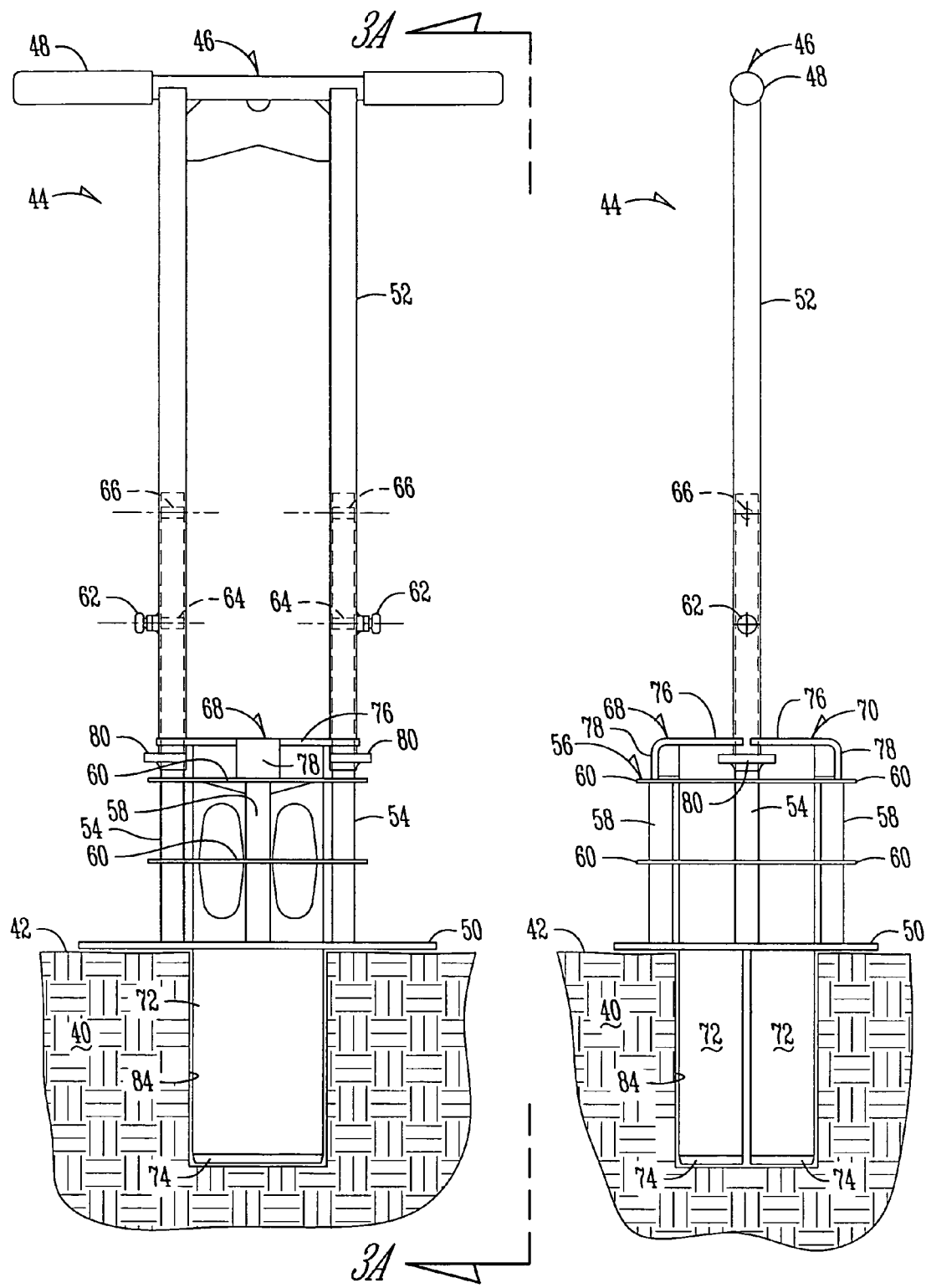
FIG. 3 is a sectional view showing the insertion of the blade halves and the ground plug into an old hole in the ground.
FIG. 3A is a side view taken along lines 3A—3A of FIG. 3.
Figure 4:
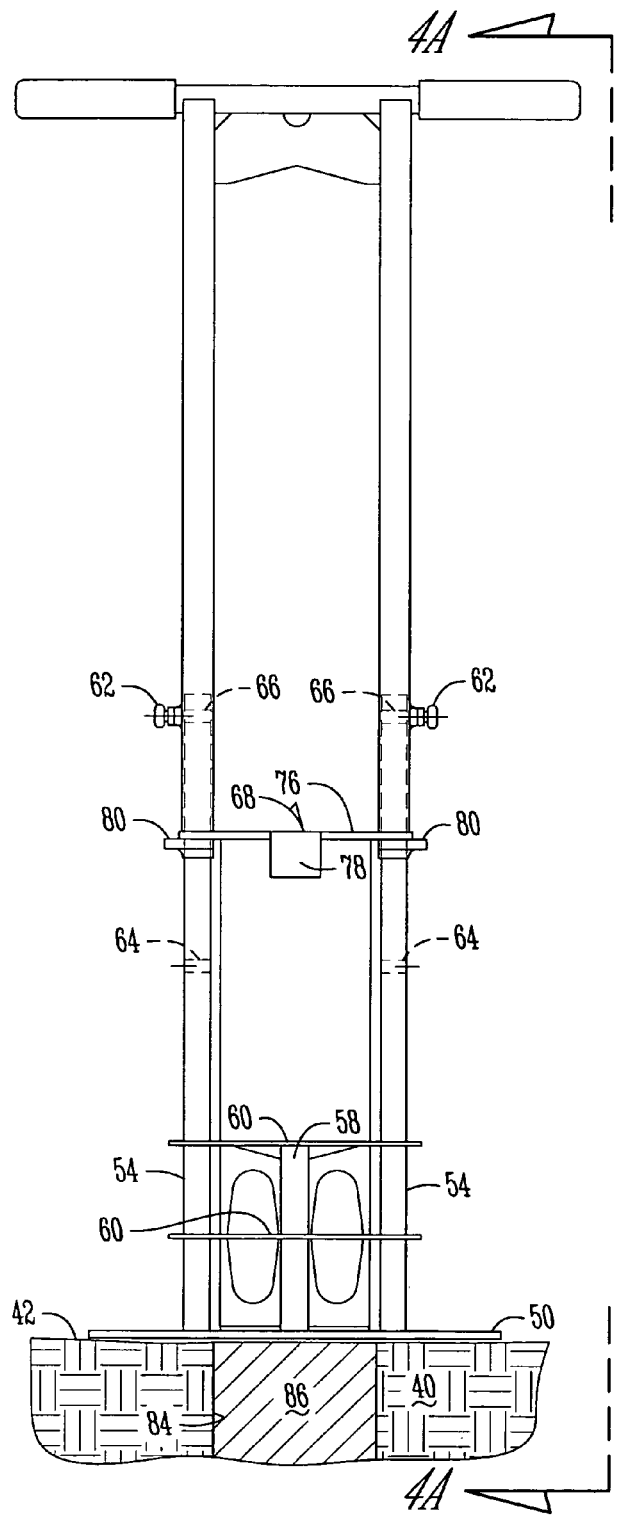
FIG. 4 is a view similar to FIG. 3, but showing the blades in their elevated position with the plug remaining in the old hole.
Figure 4A:
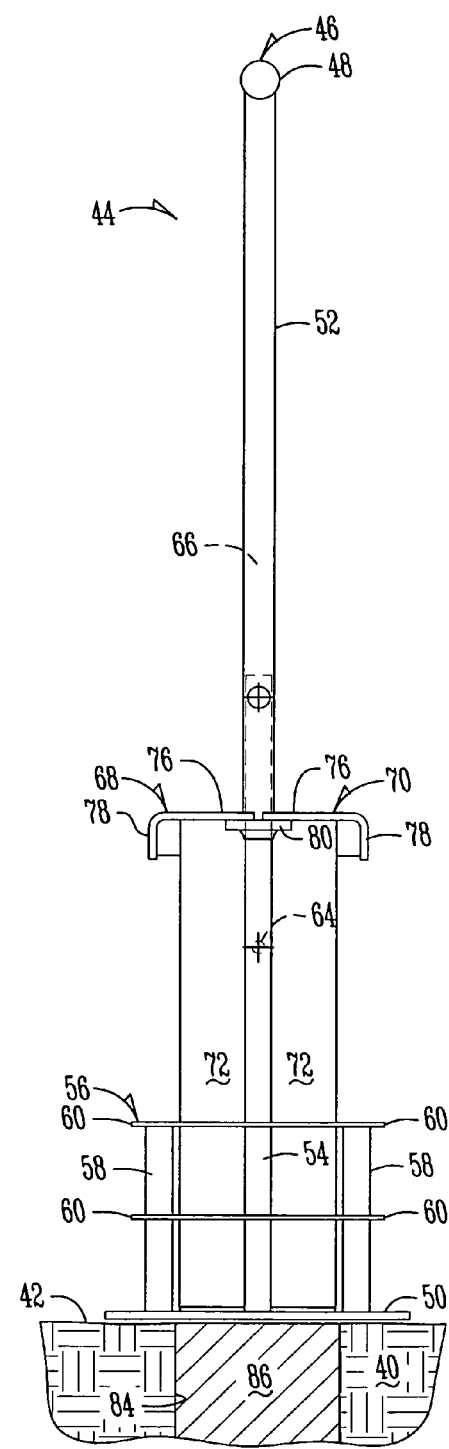
FIG. 4A is a sectional view taken along line 4A—4A of FIG. 4.
Figure 5:
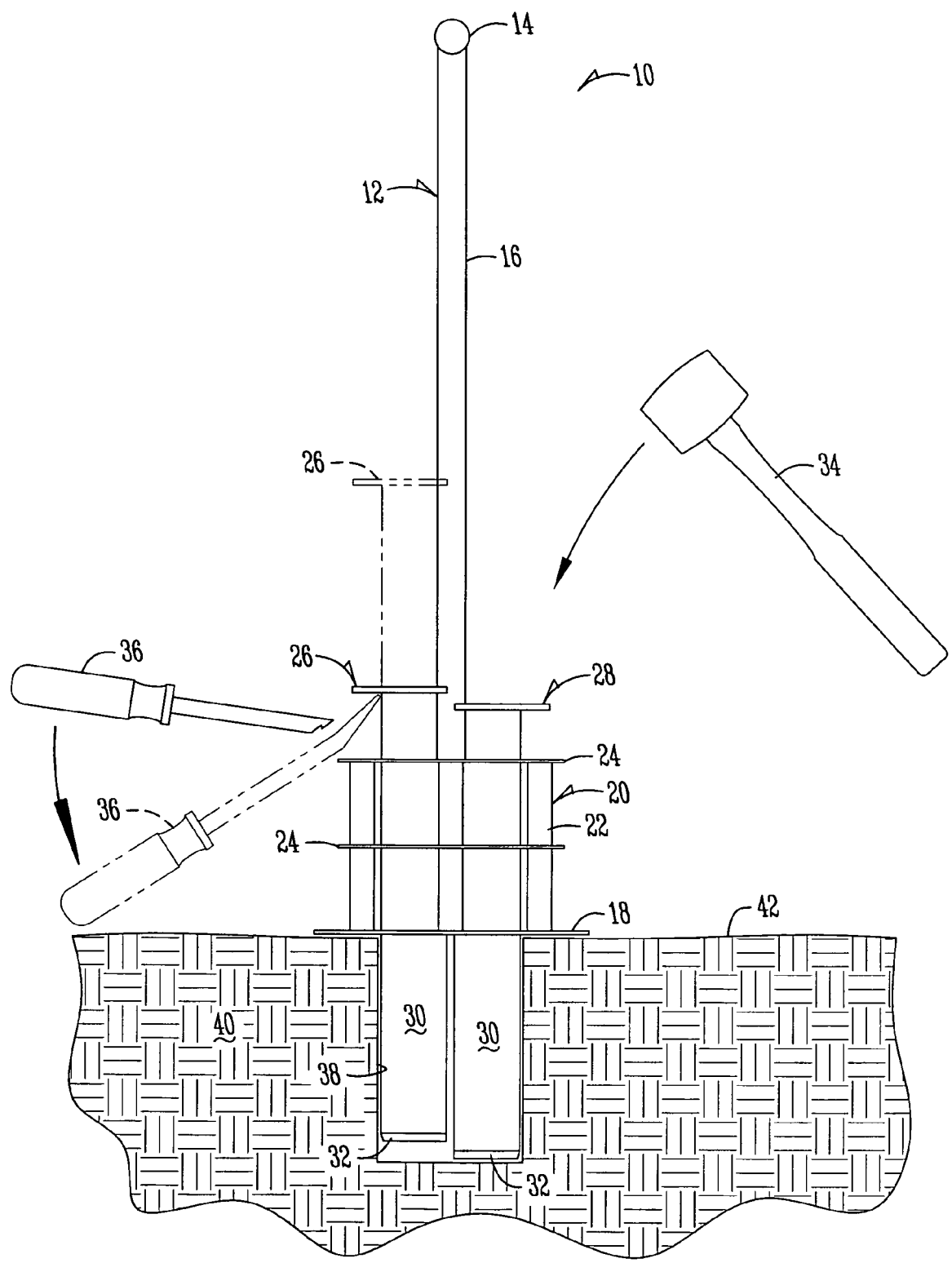
FIG. 5 is a view of a prior art hole cutter.

Spring loaded stop pins 62 are provided between the first middle frame 52 and the second middle frame 54. These spring loaded stop pins are adapted to slide within either lower pin holes 64 or upper pin holes 66 which are in the second middle frame 54. As shown in FIGS. 3 and 3A, the middle frames 52, 54 are in their lower position and the spring loaded pins 62 fit within the lower pin hole 64. In FIGS. 4 and 4A, the first and second middle frames 52, 54 are in their upper position with the spring pins 62 fitted within the upper pin holes 66 as shown in FIG. 3.

Mounted within the central opening provided by rings 60 are a first blade half 68 and a second blade half 70. These blade halves 68, 70 each include a one-half cylinder blade body 72 and a lower cutting edge 74. A hammering flange 76 is mounted at the top of the first and second blade halves 68, 70 and the hammering flange 76 includes a stop flange 78 which extends downwardly therefrom. The stop flange 78 is adapted to bear against the upper most circular flange 60 of slide frame 56 to limit the downward movement of the blade halves 68, 70 as shown in FIG. 3.

A lift flange 80 is mounted at the lower end of the middle frame 52 and is adapted to engage both of the blade halves 68, 70 when they are in their lower penetrating position shown in FIGS. 3 and 3A.

Figure 2:
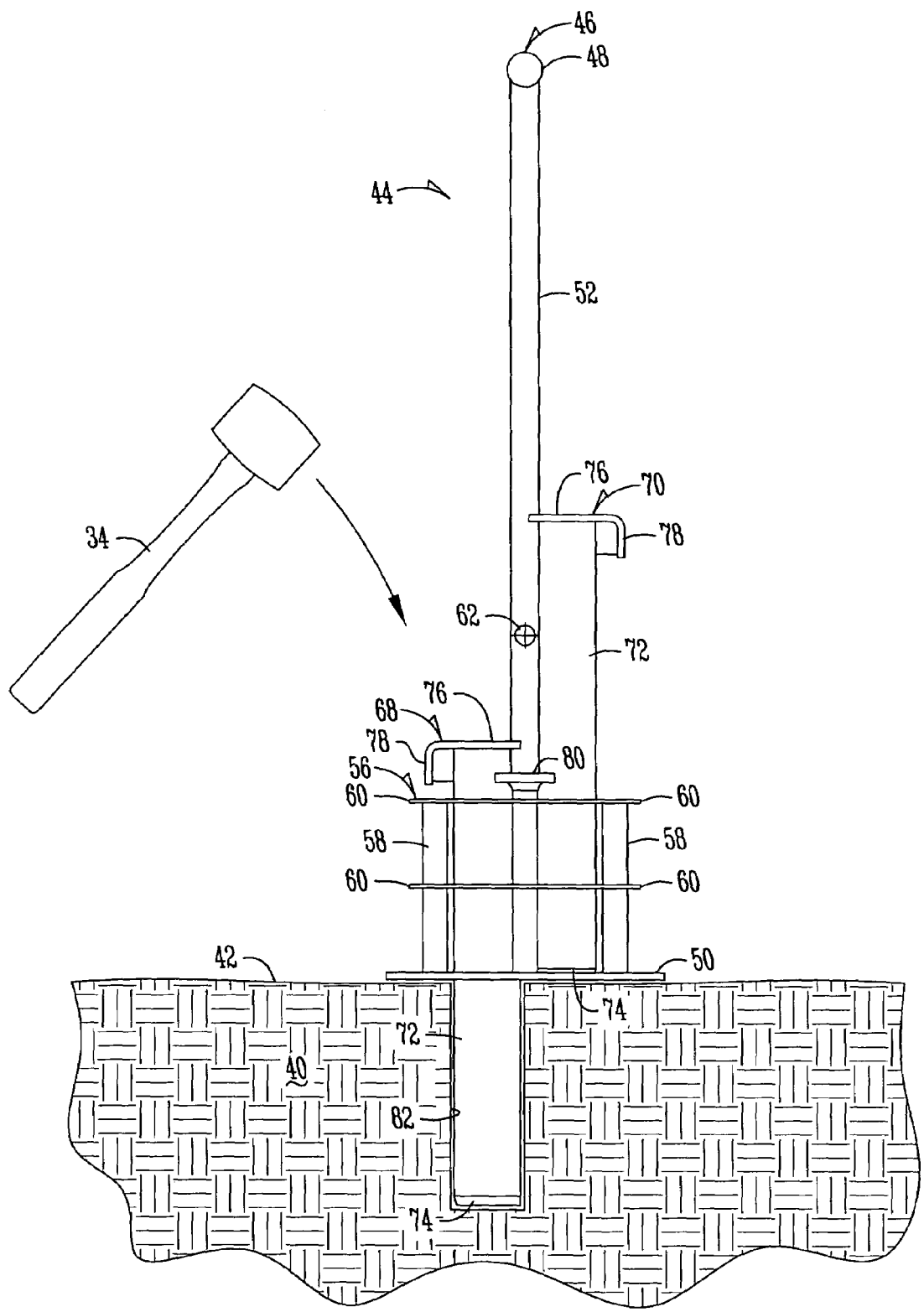
FIG. 2 is a side elevational view thereof showing one of the blade halves penetrating the ground.

The method of operation of the present invention comprises first placing the hole cutter 46 with the base 50 positioned on the surface 42 of the ground 40. The blade halves 68, 70 are initially in their elevated position such as shown by blade 70 in FIG. 2. A hammer 34 is used to impact the hammering flange 76 and drive the blade 68 downwardly so as to penetrate the surface of the ground 42 and the ground 40 to create a new hole 82. Blade 70 is shown in its elevated position and blade 68 is shown in its penetrating position in FIG. 2. After both blades 68, 70 have been driven into the ground 40, they form the new hole 82. The half cylinder blade bodies 72 surround a ground plug 86 (FIG. 4). The hole cutter 46 is lifted upwardly so as to remove the blades 68, 70 from the new hole 82. Because the blades 68, 70 surround the ground plug 86, they also lift the ground plug 86 out of the new hole 82. During this movement lift flanges 80 each engage both of the blade halves 68, 70 and cause them to move upwardly in unison from the new hole 82.

FIGS. 3 and 3A show the method for depositing the plug 86 in an old hole 84. This is accomplished by first inserting the blades 68, 70 into the old hole 84, thereby depositing the ground plug 86 therein.

The operator places his or her feet on base 50 to prevent upward movement of base 50 and second middle frame 54. Pins 62 are then moved outwardly against the spring bias and the middle frame members 52, 54 are moved to their upper position shown in FIGS. 4 and 4A. Pins 62 are then released so as to fit within the upper pin receiving hole 66 as shown in FIGS. 4 and 4A. This upward movement causes the lifting flanges 80 to engage the hammering flanges 76 of both the first and second blade halves 68, 70 as shown in FIGS. 4 and 4A. It is important that the blade halves 68, 70 are simultaneously lifted by the lift flange 80 because the lift flange 80 engages both of the blade halves 68, 70. This causes the blade halves 68, 70 to be lifted upwardly out of the old hole 84 simultaneously. They leave the ground plug 86 within the old hole 84.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A hole cutter for cutting a new hole in the ground having an upper ground surface and for taking a plug out of the new hole and placing it in an old hole in the ground, the hole cutter comprising:
    a frame comprising a handle, a base adapted to rest on the upper surface of the ground, and a middle frame interconnecting the handle and the base;
    first and second blades mounted to the frame, each of the first and second blades comprising a downwardly presented cutting edge facing toward the upper surface of the ground and a blade body positioned above the cutting edge;
    each of the first and second blades being movably mounted to the frame for movement independently of one another from an elevated position wherein the cutting edge is positioned equal to or above the base to a penetrating position wherein the cutting edge is spaced below the base;
    a lift member on the frame engaging both of the first and second blades when the first and second blades are in the penetrating position and being movable with the frame in an upward direction to lift the first and second blades simultaneously from the new hole.

2. A hole cutter according to claim 1 wherein the middle frame comprises a first middle frame member and a second middle frame member that are movably connected for longitudinal movement with respect to one another from a lower position to an upper position whereby the handle will be moved upwardly and further apart from the base when the first and second middle frame members are in the upper position.

3. A hole cutter according to claim 2 wherein the lift member is carried by the first middle frame member and engages the first and second blades when in their penetrating positions, the lift member causing movement of the first and second blades simultaneously from their penetrating position to their elevated position in response to movement of the first and second middle frame members from their lower position to their upper position.

4. A hole cutter according to claim 3 and further comprising a stop member on one of the first and second middle frame members and upper and lower stop receiving members on the other of the first and second middle frame members, the stop member retentively engaging the lower stop receiving member when the first and second frame members are in the lower position and retentively engaging the upper stop receiving member when the first and second frame members are in the upper position.

5. A hole cutter according to claim 4 wherein the stop member comprises a pin and the upper and lower stop receiving members each comprise an upper and lower receiving hole, respectively, for receiving the pin.

6. A hole cutter according to claim 5 wherein the pin is spring loaded and is biased toward retentive engagement with the upper and lower receiving holes.

7. A hole cutter according to claim 1 wherein the frame includes a slide frame having a slide opening therein, the first and second blades being contained within the slide opening and being movable for sliding movement therein between the elevated and penetrating positions.

8. A hole cutter for cutting a new hole in the ground having an upper ground surface and for taking a plug out of the new hole and placing it in an old hole in the ground, the hole cutter comprising:
    a frame comprising a handle, a base adapted to rest on the upper surface of the ground, and a middle frame interconnecting the handle and the base, the middle frame comprising a first middle frame member and a second middle frame member that are movable with respect to one another from a lower position wherein the handle is closer to the base to an upper position wherein the handle is further away from the base;
    first and second blades mounted to the frame, each of the first and second blades comprising a downwardly presented cutting edge facing toward the upper surface of the ground and a blade body positioned above the cutting edge;
    each of the first and second blades being movably mounted to the frame for movement independently of one another from an elevated position wherein the cutting edge is positioned at the same level or above the base to a penetrating position wherein the cutting edge is spaced below the base;
    a lift member on the frame engaging both of the first and second blades when the first and second blades are in the penetrating position and being movable with the frame in an upward direction to lift the first and second blades simultaneously from the new hole in response to movement of the frame in an upward direction.

9. The hole cutter of claim 8 and further comprising a stop on one of the first and second middle frame members and a first stop receiver and a second stop receiver on the other of said first and second middle frame members, the stop engaging the first stop receiver when the first and second middle frame members are in the lower position and the stop engaging the second stop receiver when the first and second middle frame members are in the upper position.

10. The hole cutter of claim 8 wherein the lifting member is a flange on one of the first and second middle frame members.

11. A method for using a hole cutter to cut a new hole in the ground having an upper ground surface and for placing a ground plug from the new hole into an old hole in the ground, the hole cutter having a frame comprising a handle, a base adapted to rest on the upper surface of the ground, and a middle frame interconnecting the handle and the base; first and second blades mounted to the frame, each of the first and second blades comprising a downwardly presented cutting edge facing toward the upper surface of the ground and a blade body positioned above the cutting edge; each of the first and second blades being movably mounted to the frame for movement independently of one another from an elevated position wherein the cutting edge is positioned at the same level or above the base to a penetrating position wherein the cutting edge is located in a penetrating position spaced below the base; a lift member on the frame engaging both of the first and second blades when the first and second blades are in the penetrating position, the method comprising:

driving the first and second blades independently of one another from the elevated to the penetrating positions whereby the lower cutting edges of the first and second blades engage the upper ground surface and penetrate the ground, thereby creating the new hole and a ground plug within the new hole;

holding the ground plug between the first and second cutting blades;

removing the first and second blades from the ground while holding ground plug there between so as to remove the ground plug from the new hole;

inserting the first and second blades and the ground plug into the old hole;

removing the first and second blades in unison from the old hole while at the same time leaving the ground plug in the old hole.

12. The method of claim 11 wherein the step of removing the first and second blades in unison from the old hole comprises lifting the first and second blades simultaneously from the penetrating position to the elevated position.

13. The method of claim 12 wherein the middle frame comprises first and second middle members that are longitudinally movable with respect to one another from a lower position to an upper position, the step of removing the first and second blades from the old hole comprising moving the middle members longitudinally with respect to one another from the lower to the upper position and engaging both of the blades with a lift member on one of the first and second middle members so as to lift the first and second blades in unison from the penetrating position to the elevated position.

14. The method of claim 13 and further comprising holding the base in engagement with the upper surface of the ground during the step of moving the middle members longitudinally with respect to one another from their lower position to their upper position.

15. The method of claim 11 wherein the step of driving the first and second blades comprises hammering the first blade from the elevated to the penetrating position within the ground, and separately hammering the second blade from the elevated to the penetrating position within the ground.

* * * * *